Figure 1:
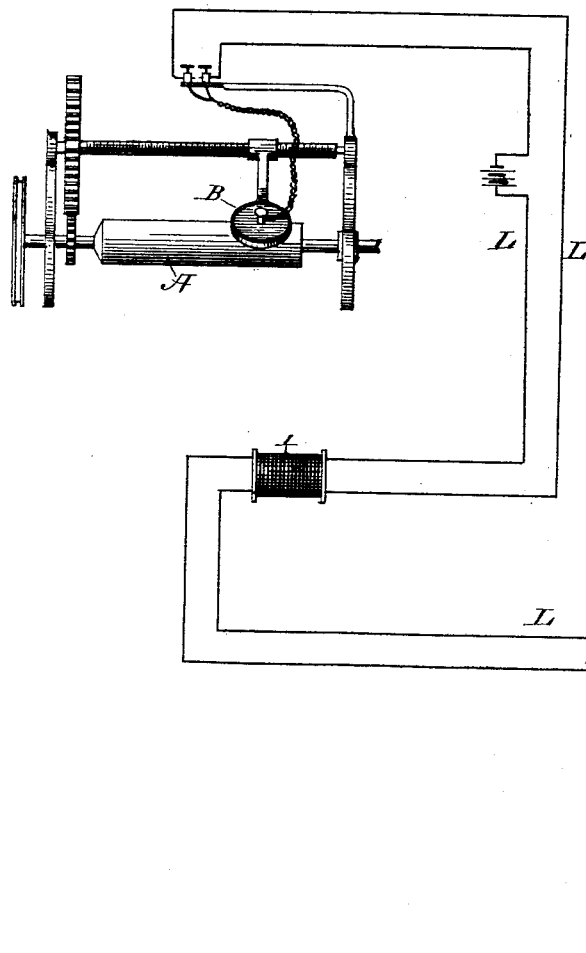

(No Model.)  3 Sheets—Sheet 1.

H. B. COX.
TRANSMITTING SOUND.

No. 520,106.   Patented May 22, 1894.

(No Model.) 3 Sheets—Sheet 2.
H. B. COX.
TRANSMITTING SOUND.
No. 520,106. Patented May 22, 1894.
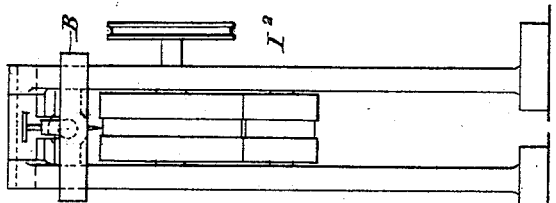
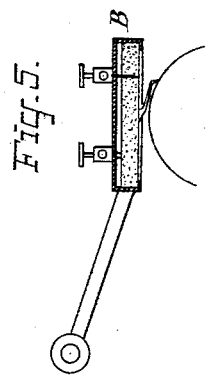
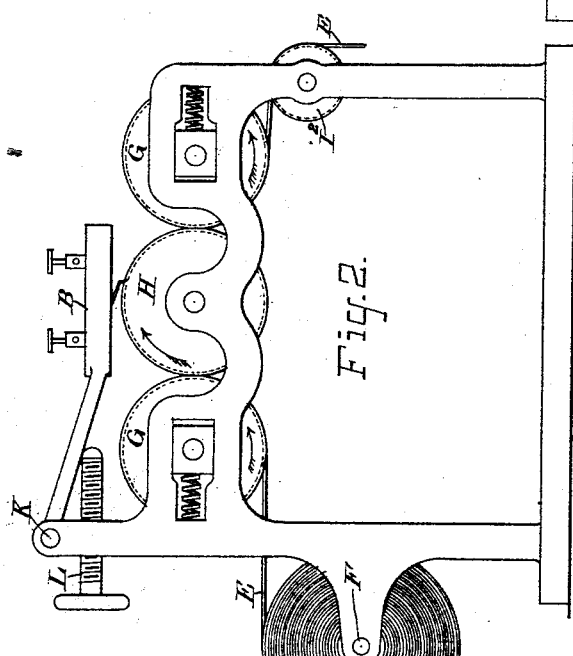
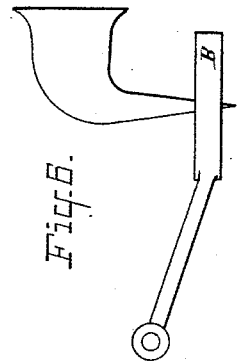
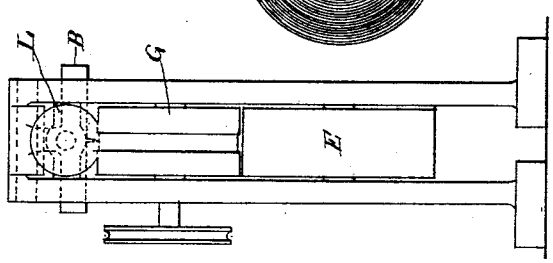
ATTEST:
INVENTOR:
Harry B. Cox
By H. C. Townsend
Attorney
THE NATIONAL LITHOGRAPHING COMPANY,
WASHINGTON, D. C.

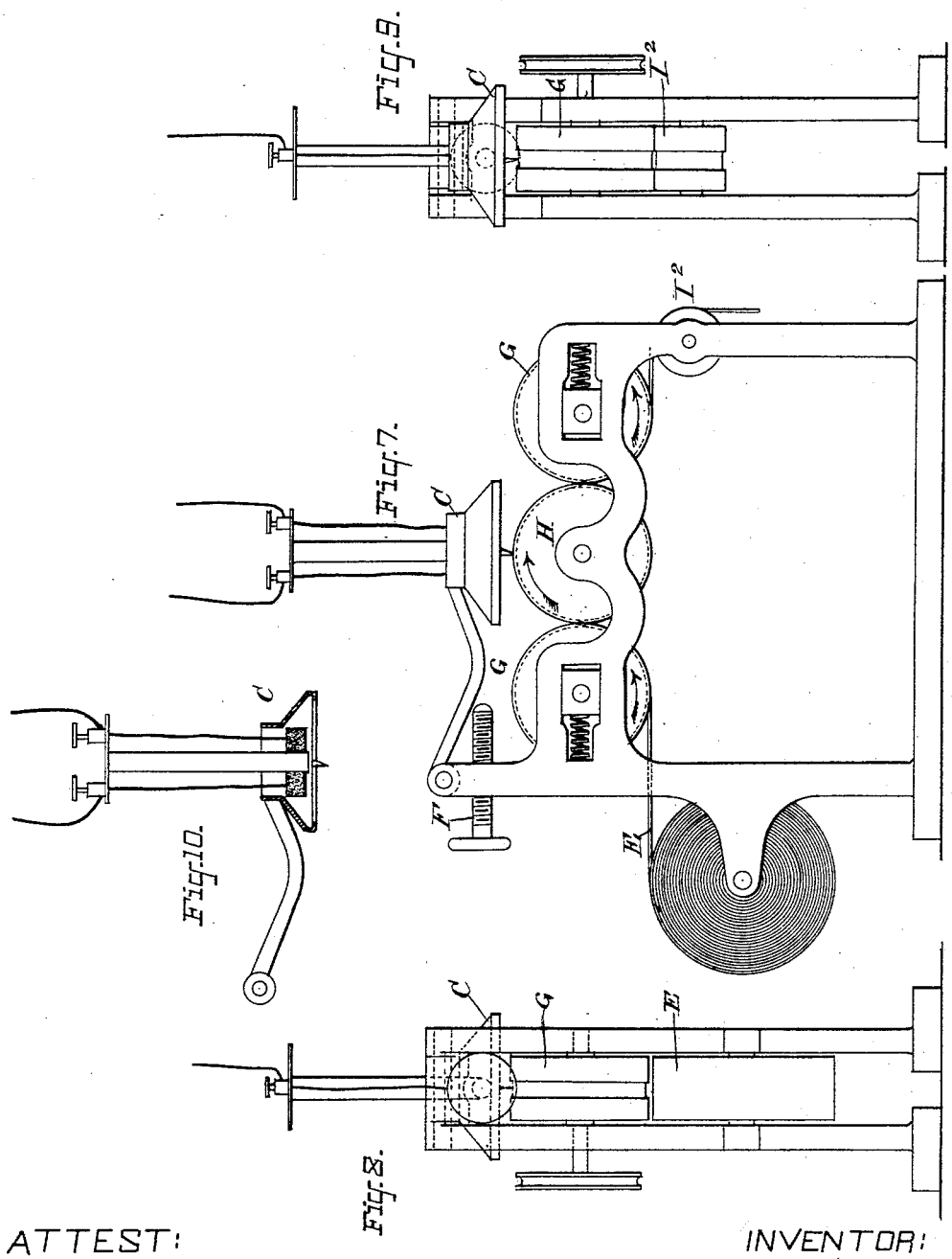

UNITED STATES PATENT OFFICE.

HARRY B. COX, OF HARTFORD, CONNECTICUT.

TRANSMITTING SOUND.

SPECIFICATION forming part of Letters Patent No. 520,103, dated May 22, 1894.

Application filed August 6, 1890. Renewed October 19, 1893. Serial No. 488,645. (No model.)

*To all whom it may concern:*

Be it known that I, HARRY B. COX, a citizen of the United States, and a resident of Hartford, in the county of Hartford and State of Connecticut, have invented a certain new and useful Method or System of Transmitting Vocal and other Sounds, of which the following is a specification.

My invention relates to the transmission of vocal or other sounds from one point to another distant point or points, and consists in a novel method or system involving the use at both points of phonograph or similar records of the vibrations representing or corresponding to the sounds to be transmitted and received.

For brevity's sake I shall hereinafter use the term "phonograph" to include graphophones, gramophones, and any other instruments or devices designed or adapted for use in recording the vibrations accompanying or corresponding to any sound, and in reproducing sounds from such a record at any desired interval after the original sound producing them.

The term "phonogram" or sound record, as used in this specification, is to be understood as including any record of the sound vibrations adapted to reproduce such sound vibrations directly or indirectly and by mechanical, electrical or other means.

For the sake of simplicity I shall describe my invention as carried out by the use of devices substantially the same in their mechanical action or operation as the ordinary forms of phonograph or graphophone.

My invention consists essentially in making a suitable record of the sound vibrations accompanying or representing the sound which is to be transmitted, transmitting the sound vibrations to the distant point by means of such record, but in a condensed or compressed form so that the vibrations will succeed one another with a greater rapidity than the vibrations of the original impressing sound, recording the condensed or more rapid vibrations at the distant point, in any suitable way, and then reproducing the original sound from such record directly or indirectly by operating the same or a reproduction of it at such reduced speed as to permit the sound vibrations to be apprehended as an articulate or other sound the same as the original sound which was used in producing the original sound record.

It is well known that in reproducing the vocal or other sounds indented, impressed or otherwise recorded as a phonogram, such phonogram should be operated at approximately the same speed as when the original sound was recorded. A certain variation is permissible and a decrease of the rate in reproducing the sound will, if not too great, simply lower the pitch of the sound while an increased rate will produce not only an increase of the loudness of the sound but will cause it to be pitched in a higher key. It is found, however, that a practical limit exists to the rapidity with which the sound vibration may be reproduced and be distinguishable or have the distinguishing characteristics of the original sound; if the speed be too high, the sound emitted from the apparatus will be simply a high squeak and unintelligible as speech or as any sound resembling the original one. I have discovered, however, that in the accurate transmission of sound vibrations over a telephone line either electrically or mechanically, and the accurate recording of such vibrations, no such limit of speed exists, and I have been able in practice to transmit from a sound record at a speed as much as thirty (30) times greater than the speed used in producing the original sound record, and yet to obtain a sound registry or record at the distant end of the line from which, by suitable reduction of speed, the original sound may be reproduced with substantially all of its characteristics.

By my invention or discovery an ordinary telephone line may be made to have the capacity of a great number of telephone lines as a means of transmitting intelligence, and my invention, therefore, provides a practical substitute for the ordinary rapid telegraphs heretofore employed.

Another characteristic of my invention or discovery is that the difficulties arising in ordinary rapid telegraphs from static discharge or from tailings are entirely absent, and I find that this element of disturbance seems to have no practical effect in changing the character of the sound vibrations during transmission over the electrical line, although the speed or rate of the vibrations is enormously increased over those which exist on ordinary telephone lines.

While I prefer to employ electricity as the agent for transmitting, at increased speed or rate, the recorded sound vibrations from one point to the other and while my invention finds its chief field of utility in connection with the long distance telephone systems at present in use, it will be obvious that the invention is not confined to any particular device or agent for conveying the condensed or more rapid vibrations to a distance and that it would be within my invention to transmit vibrations at the increased or rapid rate by molecular or mechanical vibrations of a wire, as in the mechanical or acoustic telephone.

In the accompanying drawings:—Figure 1, is a diagram illustrative of the essential part of my invention. Fig. 2, is a side elevation of a form of instrument that may be employed in putting the recorded sound vibrations upon an electric circuit into a more rapid or condensed form, and comprises essentially an electric telephone or microphone transmitter combined with a suitable means for operating it from a phonogram or sound record. Fig. 3, is an end elevation of the transmitting apparatus. Fig. 4, is an elevation of the opposite end of the apparatus. Fig. 5, shows in cross section a form of microphone that may be employed. Fig. 6, illustrates a mechanism that might be employed in connection with the apparatus, Fig. 2, for impressing or producing the original sound upon the phonogram used for operating the microphone. Fig. 7, is a side elevation of the instrument for recording the condensed vibrations at the receiving end of the line. Figs. 8 and 9, are end elevations of the apparatus as seen from opposite ends. Fig. 10, is a vertical section of the part of the receiving instrument used for transmitting the electrical vibrations into mechanical vibrations for indenting or impressing the material employed as the phonogram.

Referring to Fig. 1, A, indicates a cylinder upon which the vibrations of the sound to be transmitted have been impressed or indented in any suitable manner, and B, indicates the microphone or telephone transmitter to which vibration is communicated from the sound record on A.

The operation of a telephone transmitter by means of a phonogram has been before proposed and is not claimed by me as my invention.

The instrument B, rides upon the phonogram after the manner of a reproducer in an ordinary phonograph so as to follow the indentations, and may be constructed as indicated in the side view, Fig. 5, where I have shown an ordinary form of microphone known as the Hunnings transmitter. The diaphragm of the telephone transmitter carries the stylus which follows the phonogram record so that the phonograph will operate upon the telephone contacts and transmit the vibrations as electrical vibrations to the electric line L. At the receiving end of the line L, $A^2$, indicates a cylinder of wax or other suitable material adapted to record the vibrations transmitted over the line. Such record may be produced from a telephone receiving instrument C, the diaphragm of which carries a stylus after the manner indicated in Fig. 10, which stylus is adapted to form a phonogram or sound record upon the cylinder $A^2$, after the manner of an ordinary telephone. Suitable means, as indicated, are provided for giving motion to the parts. The transmitted vibrations may be relayed by means of an induction coil indicated at I, although this is immaterial to the essence of my invention.

The instruments having been arranged, as shown, are revolved or operated at a rapid and approximately the same rate; synchronism, however, not being necessary. By thus operating the two instruments the recorded sound vibrations of the cylinder A, will be transmitted over the electric circuit as a set of very much condensed and more rapid vibrations, and such condensed or rapidly recurring vibrations will be recorded upon the cylinder $A^2$. The whole record upon A, having been transmitted, which may be done in a fraction even one thirtieth of the time employed in uttering the words to produce the record on A, or in producing the other recorded sounds, the vibrations recorded on $A^2$, may be reduced to intelligible sounds by simply operating the record of such condensed vibrations at approximately the speed which was used in recording the original sound to be transmitted.

It will be understood that certain variations from the original speed would be permitted within the limits which would result only in changing the pitch of the sound. It will be found on operating the record at the receiving end in the manner stated that the sound vibrations which, in the process of transmission, would represent nothing but an unintelligible high pitched squeak, will become perfectly intelligible speech.

In the methods of transmitting vocal or other sounds heretofore employed it has been necessary to retain upon the line substantially the original rate of vibration and the limit to the rapidity with which the vocal or other sounds could be transmitted has been the rate at which they could be articulately or intelligibly uttered at the transmitting end and clearly understood or apprehended directly from the receiving instrument. Any pronounced departure from the original rate of vibration would make the speech unintelligible. In my system the original vibrations need only be intelligible ones, while in the transmission of the same from the one point to the other, the rapidity or rate of vibration may be so condensed or increased that, considered as a sound, only a high pitched squeak would be heard. The record of such condensed vibrations, however, as before explained, can be resolved or made to produce the intelligible sound by using it to reproduce the vibrations at the proper rate.

It will be obvious that in carrying out my invention the record A, may be produced on the same machine which is employed in connection with the transmitter B, the latter instrument simply taking the place of what is known as the reproducer in an ordinary phonograph. It will be understood, however, that the instrument will be driven at a greater rate when used to operate the transmitter B. Similarly, it will be understood, that the record $A^2$, might be used in connection with the machine upon which the condensed vibrations are received, it only being necessary to apply the usual reproducer to the record and to operate the machine at the much slower rate required. These, however, are matters of detail that will not affect the principle of my invention, and the mechanism for producing and reproducing the sound or for transmitting and receiving the same in condensed form, do not constitute my present invention and may be indefinitely varied.

While I prefer to employ a telephone receiver as the means for converting the electrical vibrations into a sound record by imparting mechanical movement to a stylus which indents such record, still I do not limit myself to this way of obtaining the record, and when electricity is used as the transmitting agent, the record of the electrical vibrations representing the condensed sound vibrations might be produced by means of such electrical vibrations in any other manner, provided such record be in such shape that it could be used directly or indirectly after production as the means for reproducing the original sound vibrations at the proper or desired rate.

In the remaining figures of the drawings, I have shown a form of apparatus wherein the sound record is supposed to be made upon a tape covered with wax or other suitable material adapted to make an indented record of the sound vibrations. This form of apparatus would be more especially suited for commercial uses as it would permit a number of distinct or different oral communications to be made on separate pieces of tape which could be attached together and run through the transmitting apparatus while at the receiving instrument the separate messages could be readily detached from one another.

The particular apparatus now to be described for use with the tape phonogram is herein shown merely for the purpose of illustrating one form of apparatus that may be used in practicing the invention herein claimed, and it is not to be understood that such form of apparatus is essential to the invention as it is merely one form of device that may be used in practicing the method or process to which the claims of the present application are confined.

In the transmitting apparatus indicated at Fig. 2, E, indicates the tape upon which the sound is recorded. Such tape may be wound upon a suitable reel, as indicated at F, and is fed between rollers G, G, and H, and out over a roller $I^2$. The rollers G, G, press the tape toward roller H, and rotation may be imparted to the roller H, or to any other part of the apparatus, by any suitable means. The several rollers are grooved on their faces at the parts which lie beneath the sound record so that the same may not be damaged as the tape is fed through the machine. The transmitter B, is hung upon an arm which swings upon a shaft K, and the position of the stylus with relation to the record may be adjusted by means of the screw L. The telephone transmitter is electrically connected with the receiver C, Fig. 7, properly mounted, as shown, over a tape fed between rollers similarly constructed to those of Fig. 2. The tape used in this instance is a blank tape which is adapted to be indented by the stylus carried by the diaphragm C, or to be otherwise operated upon so as to receive an impression of the vibrations of the diaphragm produced by the condensed vibrations upon the electric line. The sound record or records as, for instance, the record of speech, having been properly prepared on the tape E, the machine Fig. 2, is run at such rate as to carry the tape with its record under the transmitting stylus at a greater speed than it ran when originally impressed, and the receiving instrument Fig. 7, is run at the same or, if desired, a different rate. The record made on the tape E, Fig. 7, is employed for reproducing the sounds by running the same under the stylus of a reproducing apparatus at the proper speed.

In Fig. 6, I have shown a device which might be employed for impressing the original sound to be transmitted, upon the tape E, in the machine used for transmitting such sound vibrations at the increased rate. The device consists simply of the usual mouthpiece and vibratory plate carrying the stylus for indenting the tape, the whole being mounted upon the arm K, so that it may be moved into position for impressing the sound record and may then be moved away, and the instrument B, moved into place.

While I have in the foregoing description described the instruments at the receiving and transmitting ends as run approximately at the same speed, I do not by any means limit myself to operating them in such manner, since it would be entirely within my invention to run the receiving apparatus at a less speed or at a greater speed than the transmitting devices so that the indentation or other changes in the blank forming the phonogram would recur on the same with greater or less frequency than they occur on the record which is used directly at the transmitting end for placing the sound vibrations upon the line for transmission in condensed form.

The essence of my invention consists in running the transmitting apparatus at such speed that the sound vibrations representing the original sound shall be placed upon the line in condensed form, thus giving to the line a greater capacity than it would have if the oral communication were spoken to an ordinary telephone transmitter connected therewith.

While I have stated that the rate of vibration may be increased so that if it were attempted to produce a sound by such vibrations without changing the speed, no intelligible result could be obtained, I do not wish to be understood as limiting myself to increasing the rate of vibration on the line to such extent.

What I claim as my invention is—

1. The herein described improvement in transmitting vocal or other sounds consisting in recording the sound vibrations and telephonically transmitting such recorded vibrations in condensed form, as and for the purpose described.

2. The herein described improvement in transmitting vocal or other sounds consisting in making a phonogram record of the sound vibrations, transmitting the sound vibrations therefrom in condensed condition to the distant station, recording the sound vibrations, and reproducing the original sounds from the record by operating the same at a reduced speed, as and for the purpose described.

3. The herein described improvement in transmitting vocal or other sounds consisting in making a record of the sound vibrations, and running such record at an increased speed as the means for operating a telephone transmitter, receiving the transmitted vibrations on a telephone, recording the vibrations of the latter and from the said record reproducing the original sound.

4. The herein described improvement in transmitting vocal or other sounds consisting in making a record of the sound vibrations, producing by the same similar electrical vibrations of greater rate upon an electric circuit, transforming the electrical vibrations into mechanical vibrations, impressing or recording the same upon a suitable phonogram-blank, and reproducing the original sound from such phonogram directly or indirectly, as and for the purpose described.

Signed at New York, in the county of New York and State of New York, this 5th day of August, A. D. 1890.

HARRY B. COX.

Witnesses:
WM. H. CAPEL,
HUGO KOELKER.